United States Patent [19]

Fassauer

[11] Patent Number: 5,048,275
[45] Date of Patent: Sep. 17, 1991

[54] AIR-FLOATED APPARATUS HAVING STRUCTURAL CHANNEL MEMBER AND PRESSURE SEAL

[76] Inventor: Arthur L. Fassauer, P.O. Box 124, Canyon, Tex. 79015

[21] Appl. No.: 579,048

[22] Filed: Sep. 7, 1990

[51] Int. Cl.⁵ .............................................. A01D 53/00
[52] U.S. Cl. ..................................... 56/12.8; 15/345; 15/371
[58] Field of Search ................... 56/12.8, 13.4; 15/300.1, 301, 303, 306.1, 312.1, 312.2, 314, 315, 318, 327.1, 327.2, 327.3, 341–342, 345, 346, 359, 371

[56] References Cited

U.S. PATENT DOCUMENTS

| | | | |
|---|---|---|---|
| 2,961,689 | 11/1960 | Meyerhoefer | 15/371 |
| 4,361,001 | 11/1982 | Almond et al. | 56/12.8 |
| 4,592,111 | 6/1986 | Berfield | 15/371 |
| 4,670,936 | 6/1987 | Hanson | 15/345 X |

*Primary Examiner*—Thuy M. Bui
*Attorney, Agent, or Firm*—David H. Judson

[57] ABSTRACT

The present invention describes improvements to an air-floated apparatus having a deck with an open bottom, a platform enclosing a portion of the open bottom of the deck to define a pressure chamber, and an impeller for pressurizing air in the pressure chamber to float the housing above a support surface, the platform having an opening and the deck having an outer periphery. According to the invention, a novel structural member is supported between the deck and the platform along a predetermined portion of the deck outer periphery, the structural member including an upper wall and a lower wall defining a chamber. A pressure seal is supported in the platform opening.

17 Claims, 5 Drawing Sheets

FIG. 5

AIR-FLOATED APPARATUS HAVING STRUCTURAL CHANNEL MEMBER AND PRESSURE SEAL

TECHNICAL FIELD

The present invention relates generally to an air-floated apparatus, such as a vacuum cleaner or lawn mower, that floats on an air cushion during operation.

BACKGROUND OF THE INVENTION

It is known in the prior art to provide an apparatus, such as a lawn mower, which is air-supported and thus does not require ground wheels and axles and other parts normally used for supporting the apparatus on the ground. Generally, such devices include a substantially-enclosed housing and means for pressurizing air within the housing to float the housing over a support surface. Examples of such devices are shown in U.S. Pat. Nos. 3,170,276, 3,293,836 and 4,245,455.

While air-floated devices of the prior art have significant advantages over conventional wheeled products, such devices have certain inherent problems which have yet to be overcome. In particular, such devices typically include an outer housing having a narrow peripheral edge, bezel or seal. Consistent flotation of devices of this type is difficult due to the tendency for the volume of air to escape due to the typical ground effect adjacent such narrow edge structures. Other problems include the inability to maintain lateral or side-to-side stability of the device.

It would therefore be desirable to provide an improved air-floated apparatus that overcomes these and other problems associated with the prior art.

BRIEF SUMMARY OF THE INVENTION

It is an object of the present invention to provide an air-floated apparatus, such as a vacuum cleaner or lawn mower, that floats on an air cushion during operation.

It is yet another object of the present invention to provide an air-floated apparatus that can be moved in any direction without tipping or rolling.

It is still a further object of the invention to describe an air-floated apparatus that is simple to construct, has few moving parts and which is easy to maintain.

It is an object of the invention to provide an air-floated apparatus that includes a novel structural channel member that has multiple functions and methods of use.

More specifically, it is object of the invention to describe a novel air-floated apparatus designed and engineered with a modular structural channel member that is capable of several versatile functional uses. In particular, the structural channel member is designed to function as a vacuum chamber, an air pressure chamber for flotation, or as a module for supporting liquid used to balance the center-of-gravity of the housing to facilitate an absolutely level flotation platform.

It is still another object of the invention to provide an air-floated apparatus that has improved stability and gliding manuverability.

It is yet a further object to use a channel member in combination with a conveyance duct or vessel for the transport of dust and debris or, alternatively, to provide air pressures to float the apparatus housing.

It is another object of the invention to provide an air-floated apparatus that includes a flexible pressure seal to prevent a volume of air from escaping underneath the housing of the cleaner during operation.

It is still a further object of the invention to provide a flexible pressure seal for an air-floated vacuum cleaner apparatus that directs air pressure, which provides the lift of the housing, downward through the carpet or surface area, thus bleeding the air pressure over a larger area rather than externally to the housing as in the prior art. This operation prevents air pressure that would normally escape outwardly into the vacuum source area or outwardly from the housing from blowing debris or dust into the room.

Still another object of the invention is to combine a structural channel member and a flexible pressure seal in an air-floated vacuum apparatus to fully separate or isolate the pressure environment from the vacuum environment and thus maximize each mode of operation.

These and other objects of the invention are provided in an air-floated apparatus having a deck with an open bottom, a platform enclosing a portion of the open bottom of the deck to define a pressure chamber, and means for pressurizing air in the pressure chamber to float the housing above a support surface, the platform having an opening and the deck having an outer periphery. According to the invention, a novel structural member is supported between the deck and the platform along a predetermined portion of the deck outer periphery. The structural member includes an upper wall and a lower wall which together define a chamber. The apparatus also advantageously includes a pressure seal supported in the platform opening to prevent air pressure from escaping outward from the housing to provide maximum pressurization.

In one embodiment of the invention, the chamber is fully enclosed and supports a liquid medium or the like. When the structural member is supported adjacent the frontal portion of the apparatus, an additional weight is thus provided by the liquid medium. The weighted structural member cooperates with the pressure seal to provide a stable center-of-gravity during flotation of the apparatus. Alternatively, a solid weight is supported in the chamber.

In another embodiment, the air-floated apparatus is a vacuum cleaner that includes a shroud overlying the deck such that a conveying duct or vessel is formed between the deck and a portion of the housing along a frontal portion of the apparatus, along a back portion, or along the frontal portion and the side portions thereof, or any combination thereof. In this embodiment, the structural member includes a slot in the lower bottom wall thereof extending along the length of the one or more duct(s). The apparatus includes a vacuum source for exhausting air from the conveyance duct(s) to suction material from the support surface to a bag.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
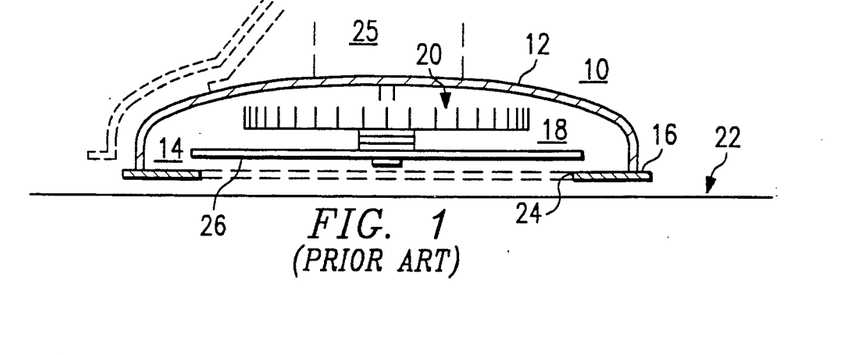
FIG. 1 is a sectional view of an air-floated apparatus of the prior art.

Referring now to FIG. 1, a simplied view is shown of a prior art air-floated apparatus 10 for use as a rotary lawn mower. Air-floated apparatus 10 includes a deck 12 with an open bottom 14, a platform 16 enclosing a portion of the open bottom of the deck to define a pressure chamber 18, and an impeller 20 for pressurizing air in the pressure chamber 18 to float the apparatus above a support surface 22. The platform 16 has an opening 24 and the deck 12 has an outer periphery. A suitable motor 25 drives the impeller 20 and a cutting blade 26.

According to the present invention, problems associated with the prior art air-floated apparatus 10 of FIG. 1 are overcome through use of one of the various types of structural channel members 30 shown in FIGS. 2A-2D. As will be described in more detail below, the structural channel member 30 is generally supported between the deck 12 and the platform 16 along a predetermined portion of the deck outer periphery, e.g., the frontal portion of a rectangular-shaped periphery. Of course, the structural member 30 can be supported between the deck and the platform along the front and side portions of a rectangular housing or, alternatively, around substantially the entire deck periphery.

Figure 2A:
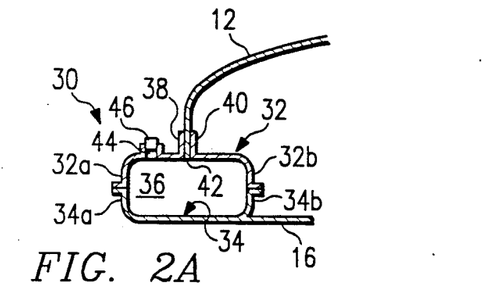
FIGS. 2A-2E are simplified views of the various types of structural channel members of the present invention for use with the air-floated apparatus of FIG. 1.

Referring now to FIG. 2A, in one embodiment, the structural member 30 comprises an upper wall 32 and a lower wall 34 defining a chamber 36 therebetween. As seen in FIG. 2A, the upper wall 32 has downwardly-extending flanges 32a and 32b, and the lower wall 34 has upwardly-extending flanges 34a and 34b. The flanges are mated are otherwise secured to form the substantially-enclosed chamber 36. The upper wall 32 preferably includes first and second flanges 38 and 40, which form a recess in which a bottom edge 42 of the deck is received. Alternatively, the channel member is simply fastened or welded to the bottom of the deck. The lower wall 34 is attached to or otherwise integrally-formed with the platform 16 in an injection molding process.

The chamber 36 is adapted to be filled with an appropriate liquid medium, e.g., water, through a fill hole 44. In particular, a plug 46 or the like is supported in each fill hole and is opened to enable the structural member to be filled with the water or other suitable medium. After filling, the plug 46 is inserted into the fill hole to seal the hole. In this embodiment, therefore, the structural member is used to add weight to predetermined front or back portions of the apparatus.

Figures 2B, 2D, 2E:
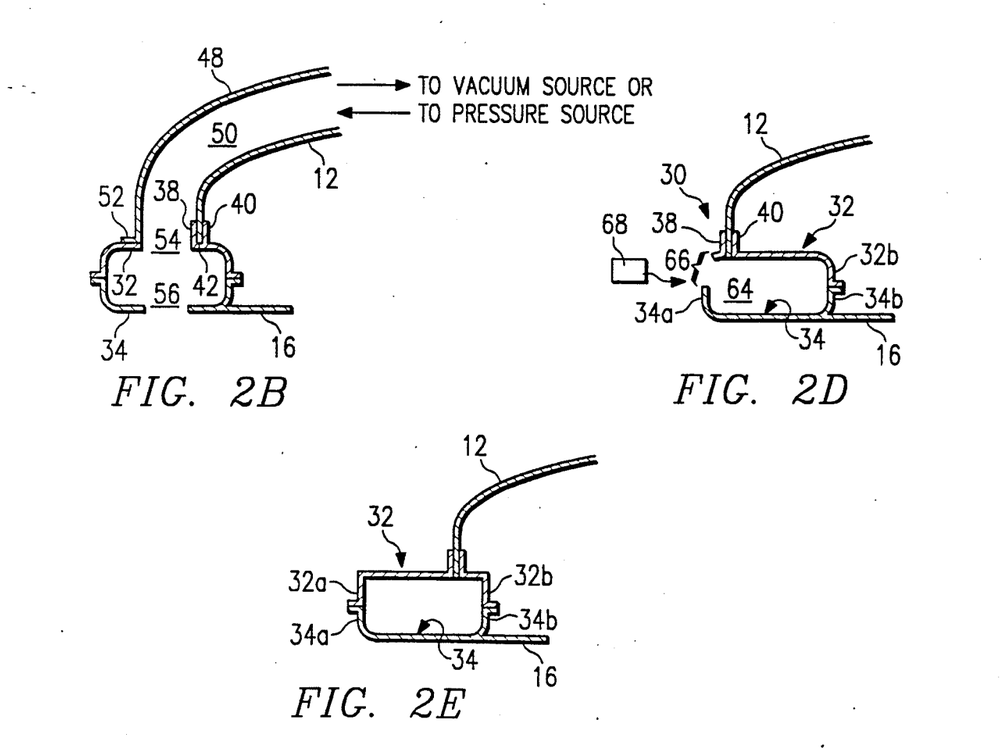

Referring now to FIG. 2B, an alternate embodiment of the structural channel member 30 is shown for use, for example, in an air-floated vacuum cleaner apparatus. In this embodiment, the first and second flanges 38 and 40 of the upper wall 32 are not centrally-located as in FIG. 2A but rather are located towards a rear portion of the upper wall 32. The bottom edge 42 of the deck 12 is supported in the recess therebetween. The air-floated vacuum apparatus includes the platform 16 and a housing 48 overlying the deck 12 such that a conveyance duct or vessel 50 is formed between the deck and the housing 48 along a frontal portion of the apparatus. The housing 48 has an outwardly-extending flange 52 to which the upper wall 32 of the structural channel member 30 is secured or otherwise affixed.

As seen in FIG. 2B, the upper wall 32 includes a slot 54 opening into the conveyance duct. The bottom wall 34 has likewise has a slot 56 extending along the length of the chamber. The conveyance duct is in communication with an impeller or other suitable means for exhausting air from the duct 50; alternatively, the duct communicates with a source of positive air pressure to thereby enable the forcing of pressurized air downward through the duct 50 and along slot 54 to thus float the device. Therefore, in FIG. 2B, the structural channel member is used as either a vacuum chamber or a pressure chamber for the air-floated vacuum cleaner.

Figure 2C:
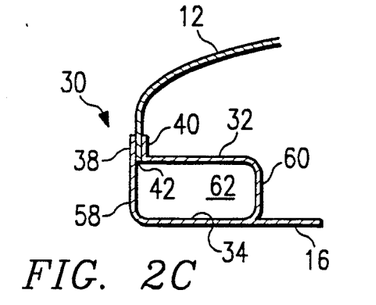

Referring now to FIG. 2C, yet another embodiment of the structural channel member is shown for use in an air-floated apparatus. In this embodiment, the first and second flanges 38 and 40 are located at a forward portion of the upper wall 32 to receive the edge 42 of the deck 12. The upper wall 32 and the lower wall 34 are integrally formed with curved side walls 58 and 60 to form an enclosed chamber 62. Chamber 62 is filled with liquid or other suitable medium for added weight to predetermined peripheral areas of the apparatus housing. The ability to add predetermined amounts of weight to selected portions of the channel member advantageously enables the apparatus to be used for different types of surfaces.

FIG. 2D shows yet a further embodiment of the structural channel member of the invention wherein the upper wall 32 includes the first and second flanges 38 and 40, and a single downwardly-extending flange 32b. The bottom wall 34 includes the upwardly-extending flange 34a and 34b, and flange 32b mates with or is otherwise fastened to the flange 34b. A chamber 64 is formed between the upper and lower walls 32 and 34. Chamber 64 has an opening 66 through which weights or other suitable loading devices 68 are placed into the chamber 64 and supported on the lower wall 34. This structure enables dynamic variation of the amount of weight supported on the peripheral area of the apparatus.

Referring now to FIG. 2E, another preferred construction of the structural channel member 30 is shown. In the embodiment, the upper wall 32 includes the downwardly-extending flanges 32a and 32b except that these flanges are squared-off with respect to the upper wall 32. The lower wall 34 has the upwardly-extending flanges 34a and 34b which are rounded-off with respect to the lower wall.

The various types of structural channel members shown in FIGS. 2A-2E have certain advantages when incorporated into various air-floated apparatus, as will now be described. Although the remainder of the discussion describes various types of air-floated vacuum cleaner apparatus, it should be appreciated that the principles of the invention are applicable to other types of air-floated devices, such as rotary lawn mowers, luggage, toys, etc.

Figure 3A:
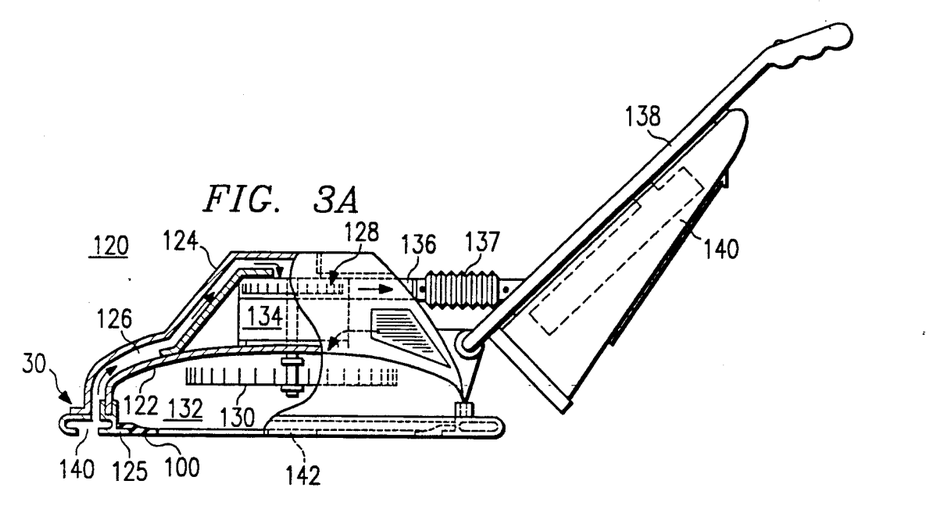
FIG. 3A is a side view, partially cutaway, of an air-floated vacuum cleaner incorporating one embodiment of the structural channel member.
Figures 3B, 3C:
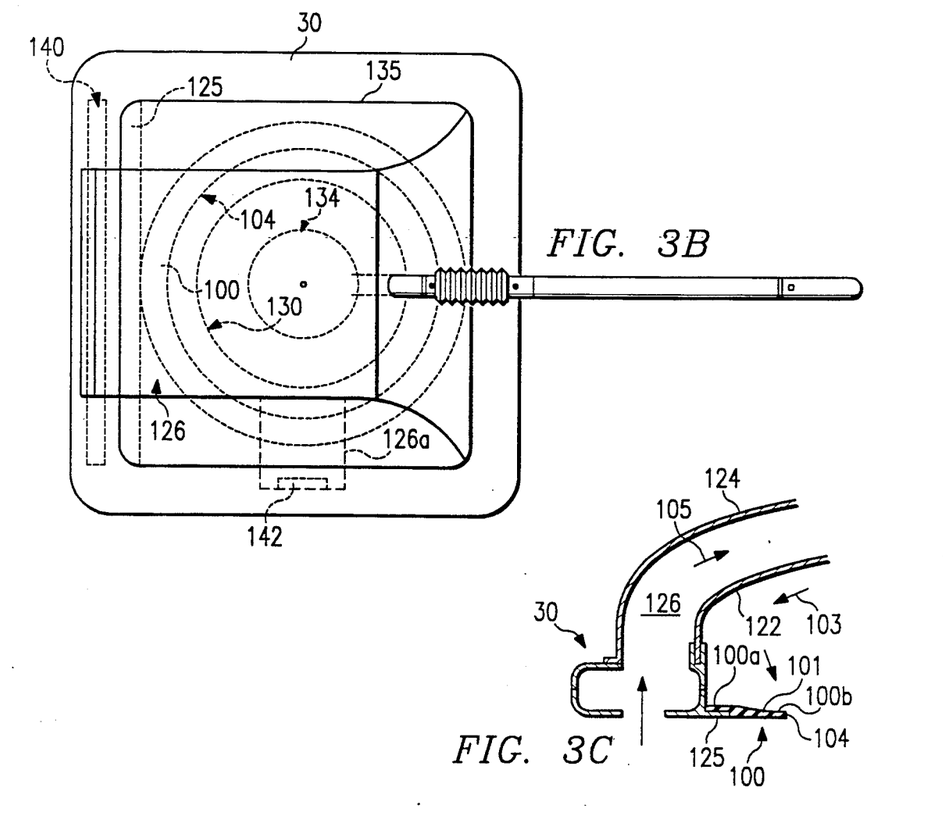
FIG. 3B is a plan view of the vacuum cleaner of FIG. 3A.
FIG. 3C is a detailed sectional view of the structural channel member of the vacuum cleaner of FIG. 3A.

Referring now to FIGS. 3A-3B, one embodiment of an air-floated vacuum apparatus is shown in which the structural channel member 30 forms part of a vacuum chamber for the apparatus. In FIG. 3A, vacuum cleaner 120 includes a deck 122 and a housing 124 overlying the deck 122. A conveyance duct or vessel 126 is formed between the deck 122 and a portion of the housing 124 as best seen in FIG. 3B. First air impeller 128 is used to generate a vacuum force to suction dust and debris into the conveying duct 126. A second impeller 130 is used to generate air pressure in a pressure chamber 132 to float the apparatus. Motor 134 commonly drives both impellers 128 and 130. Dust and debris suctioned into the apparatus is delivered through tubing 136, which has an accordian-type section 137, through handle 138, and into the bag 140.

The deck 122 of the vacuum cleaner 120 includes an outer periphery 135 as best seen in FIG. 3B. The structural channel member 30 extends around the entire periphery 135. The structural channel member 30 also includes a slot 140 located along the frontal portion thereof. In this embodiment, one or more small side slots 142 may be incorporated along the sides of the structural channel member 30 to enable the vacuum cleaner to suction dust and debris from baseboards and the like. When the side slots are used, a side conveyance duct 126a (only one of which is shown in Phantom) connects with the frontal duct 126 and then to the vacuum source. The size of the slots 142 depends on the amount of vacuum suction required.

Accordingly, in the embodiment of FIG. 3A-3B, the channel member forms part of a vacuum chamber for suctioning dust and debris from the support surface. It has been found that the vacuum force generated along the slot 140 functions to "hold" down the frontal portion of the cleaner during operation in the same way that the water-filled module does in the embodiment of FIG. 3.

Referring to FIG. 3C, the portion of the channel member 30 along the front of the apparatus is shown. The channel member corresponds to the structure shown in FIG. 2B except that the platform 16 extends only slightly into the pressure chamber. In particular, the platform 16 includes an inwardly-extending ledge 125 upon which a pressure seal 100 is mounted. The seal 100 includes a base portion 100a and an extending lip portion 100b defined by the facing section 101 of any shape. The lip portion terminates in distal end 104. The pressurized air generated by the impeller follows the path of arrows 103, while the dust and debris is suctioned into the vacuum chamber and conveyance duct as indicated by arrows 105. The novel structural relationship between the channel member and the pressure seal insures that substantially all of the pressurized air remains within the pressure chamber.

It should be appreciated that although FIG. 3B shows a circular-shaped flexible seal, the seal can be square or rectangular depending on the shape of the opening in the platform. The flexible pressure seal is preferably formed of natural rubber, neoprene or other synthetic rubber, or plastic, and extends lateral inward from an inner peripheral surface of the platform 16. The seal is attached to the inner peripheral surface by suitable attachment means such as adhesive, fasteners, clips, brackets or other equivalent devices or mechanisms. The pressure seal cooperates with the platform to which it is attached to form a centrifugal platform/shelf on which suctioned or cut material (dust and debris or grass cuttings as the case may be) is easily and efficiently conveyed to a discharge port for collection. As will be described below, the seal is alternatively formed using a sheet affixed over the entire bottom area of the vacuum cleaner, including the underside of the channel member 30. After the sealing sheet is affixed, a hole is cut out of the sheet corresponding to the area underlying the opening in the platform 16.

Figure 4A:
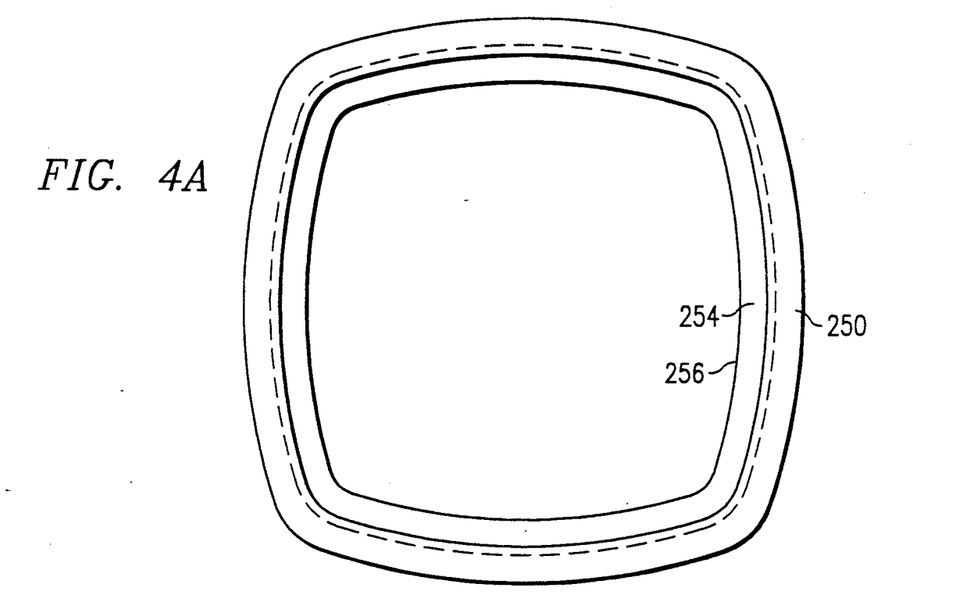
FIG. 4A is a bottom view of an alternate embodiment of the platform and pressure seal construction.
Figures 4B, 5:
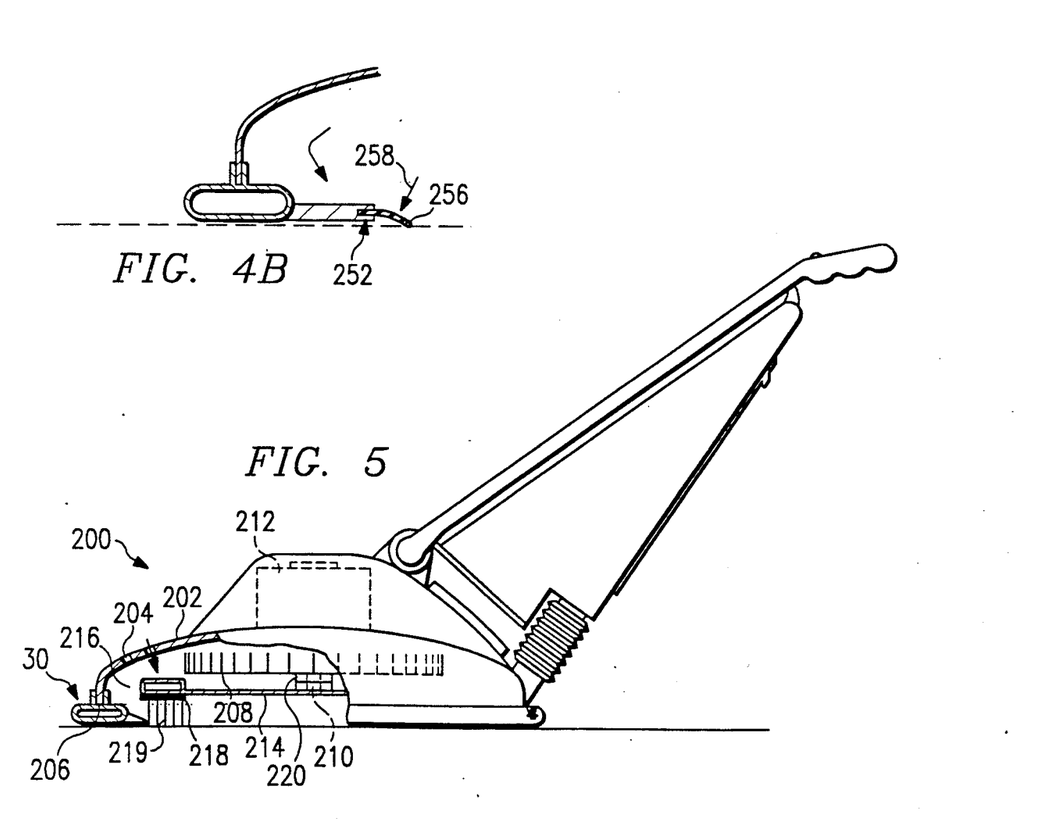
FIG. 4B is a detailed sectional view of the pressure seal of FIG. 4A during use of the apparatus.
FIG. 5 is a side view, partially cutaway, of another air-floated vacuum cleaner incorporating the principles of the present invention.

Referring now briefly to FIGS. 4A-4B, an alternate embodiment of the platform and seal is shown wherein the platform 250 has a slot 252 in which the seal 254 is received. The seal 254 has a bead 256 formed at its distal, inner end which advantageously provides an air disturbance. In operation, as best seen in FIG. 5B, the air pressure designated by arrow 258 forces the distal end of the seal 254 downward into the support surface, thereby maximizing a compression factor of the seal. The end 104 is forced downward against the support surface by the pressurized air generated by the impeller such that, in operation, substantially all of the pressurized air is prevented from escaping underneath the channel member 30, thus maintaining flotation of the apparatus. Any pressurized air that does escape past the bead bears against the relatively large bottom surface of the channel member 30.

Referring now to FIG. 5, a side view, partially cutaway, is shown of a single-impeller, air-floated vacuum cleaner apparatus 200 according to another embodiment of the present invention. Air-floated vacuum cleaner apparatus 200 includes a deck 202 having a plurality of air inlet openings 204. The deck 202 is preferably an endless housing and has a substantially rectangular shape with rounded corners. Alternatively, deck 202 can be configured in a substantially circular or rectangular shape. Deck 202 includes a continuous bottom edge 206.

The vacuum cleaner 200 includes a single air impeller 208 for pressurizing the air introduced into the housing via inlet openings 204. Air impeller 208 is mounted for rotation with shaft 210 of motor 212. A flexible vacuum module 214 is also mounted below air impeller 208 for co-rotation with shaft 210 and thus the impeller. The vacuum module includes upward extensions or members 216 for creating a vacuum behind each extension 216 as the module 214 is rotated. The vacuum module suctions dust and debris up and over the extensions and directs the suctioned material laterally outwards against the inner wall of the housing where it is centrifuged to a discharge port. Such operation is described in copending application Serial No. 07/564,197, filed Aug. 8, 1990, which is incorporated herein by reference. The vacuum module 214 advantageously includes means for supporting a plurality of flexible snap-on modules 218 having tines (or bristles) 219 for contacting the surface, such as a floor or carpet, beneath the deck 202 for agitating dust and debris on surface when the vacuum module 214 is rotated during the operation of the vacuum cleaner. Spacers 220 are positioned between the vacuum module 214 and the air impeller 208 to vertically adjust the position of vacuum module and thus the tines 219.

The vacuum cleaner includes the structural channel member 30 as described above with respect to FIG. 2A. In the embodiment of FIG. 4, channel member 30 acts to stabilize the vacuum cleaner against side-to-side lateral movement and tipping. Specifically, the channel member is weighted by the mass of water or other fluid in the chamber and advantagously acts to stabilize the vacuum cleaner against tipping or rocking, against upward movement, i.e., movement away from the support surface, and against lateral, side-to-side movement. This operation is especially beneficial when the vacuum cleaner bag begins to fill-up, which would otherwise increase the tendency of the front portion of the cleaner to pivot upwards. As described above, under certain circumstances it may be desirable to add weight to only the frontal or other predetermined portions of the cleaner. In such case, suitable baffles are located in the channel member such that the water or other medium is supported in the predetermined portions thereof.

Figures 6, 7A:
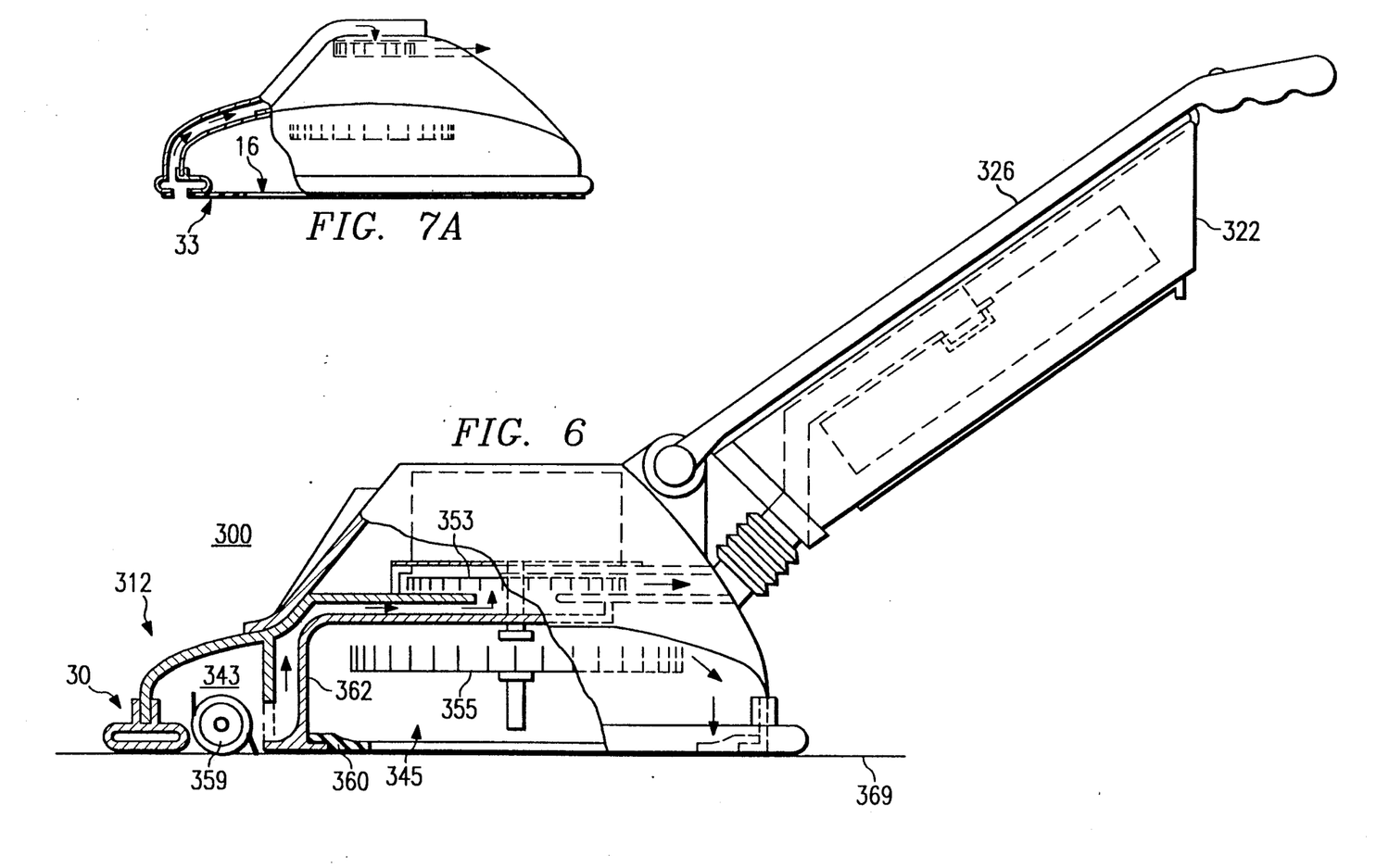
FIG. 6 is a side view, partially cutaway, of yet another air-floated vacuum cleaner incorporating the principles of the present invention.
FIG. 7A is a side view, partially cutaway, of still another air-floated vacuum cleaner incorporating the principles of the present invention.

Referring now to FIG. 6, a structural channel member is incorporated into a dual-impeller vacuum cleaner 300 having first and second chambers 343 and 345, and first and second air impellers 353 and 355. The vacuum cleaner 300 includes a rotary agitator brush 359 located in the front of the housing 312, thus the first chamber 342, which is the vacuum chamber, is located in the front portion of the housing. The rotary brush 358 includes tines or bristles for stirring up dust and debris on the support surface 359 in a conventional manner. The dust and debris is suctioned into the bag 322 supported on the handle 326 by the vacuum created by first impeller 353. Flotation of the apparatus is maintained by the pressurized air generated by the second impeller 354. As described above in FIG. 2A, preferably the vacuum cleaner includes the channel member 30 to stabilize the apparatus during flotation. The member 30 is preferably filled with water or other suitable medium to provide additional weight as required and thus horizontal and vertical stability.

As shown in FIG. 6, the vacuum cleaner 300 also incorporates the seal 360, however, in this embodiment the seal is attached near the front of the apparatus along a wall 362 dividing the first and second air chambers 342 and 344.

Figures 7B, 8:
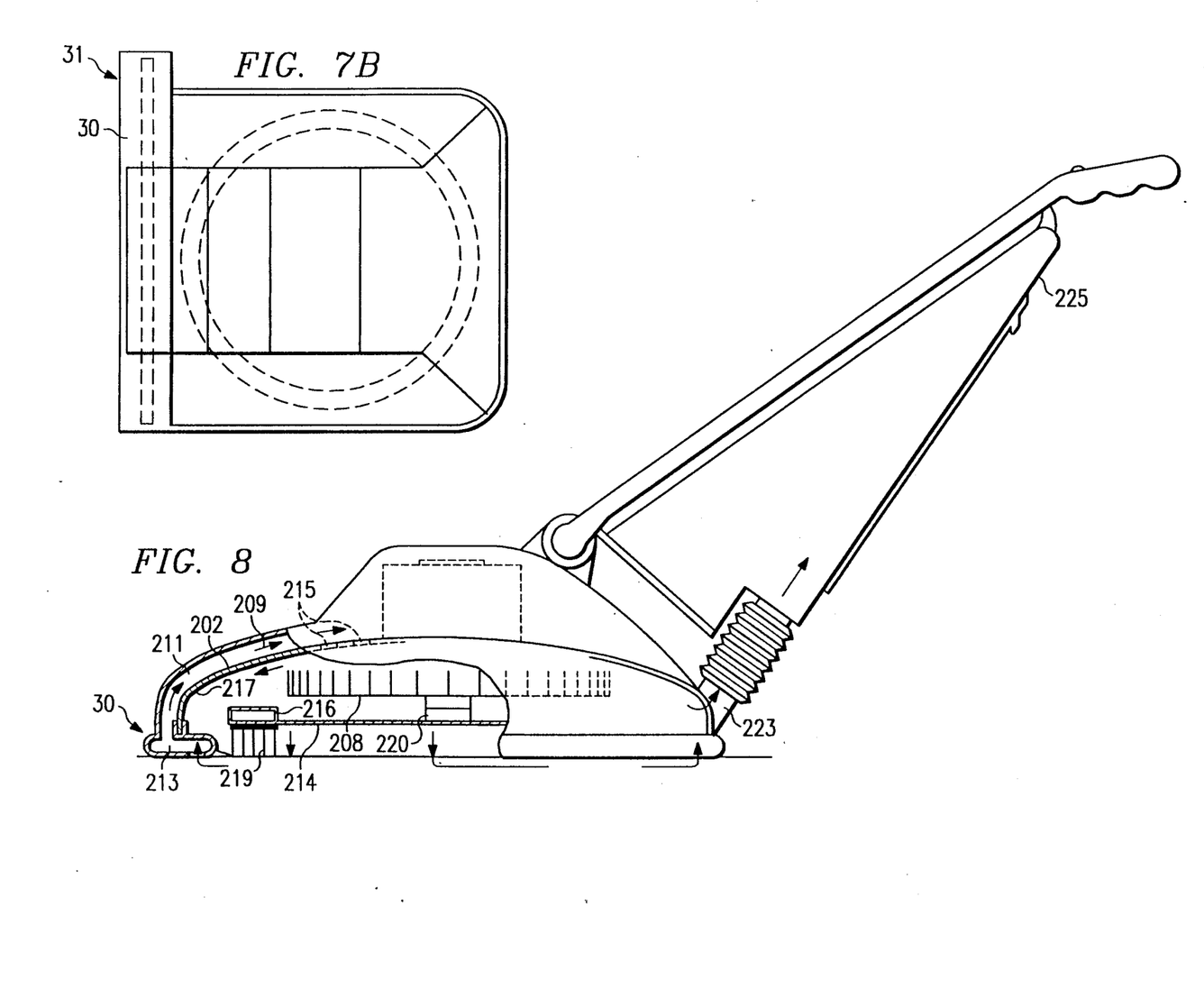
FIG. 7B is a plan view of the vacuum cleaner of FIG. 7A.
FIG. 8 is a side view, partially cutaway, of another air-floated vacuum cleaner which directs suctioned air to the intake side of the impeller used to float the cleaner.

Referring now to FIGS. 7A and 7B, an alternate embodiment of the invention is shown for a dual-impeller air-floated vacuum cleaner. In this embodiment, the structural channel member 30 is mounted in the inwardly-directed manner as best shown in FIG. 2C. The structural channel member 30 is located along the frontal portion of the housing and includes an extension 31 to facilitate suctioning of material against baseboards and the like. In this embodiment, the pressure seal 33 is formed in a sheet that overlies the entire platform 16. After affixation of the sheet, a slot is formed underlying the vacuum chamber in the structural channel member and a hole is cutout underlying the pressure chamber.

FIG. 8 shows yet another embodiment of the invention which is similar to the single impeller vacuum cleaner of FIG. 5 except that air intake holes are not provided in the outer housing. In this embodiment, in addition to the vacuum module 214, a vacuum side of the pressure impeller 208 is used as part of the suctioning force as shown by arrows 209. Dust and debris is suctioned through conduit 211 which is in communication with the inner chamber 213 of the channel member. The air drawn through the channel member is passed through the conduit 211, through vacuum air intake holes 215 and then directed back downward along the inner wall 217 of the deck 202. The dust and debris is then centrifuged around the inner wall 217 and directed to the discharge port 223 and thus into bag 225.

The present invention provides significant advantages over prior art devices. The structural channel member stabilizes the apparatus in use. The member can be used to provide a frontal, side, back or 360 degree chamber with an integral slot to form a vacuum means when the apparatus is used as a vacuum cleaner. Alternatively, the channel member is used as an air pressure chamber whereby pressure developed by an air impeller is channeled downward through a conveyance duct into the channel member and through a slot thereof for flotation. Moreover, the combination of the channel member and the flexible seal promotes a maximum air pressure and air volume that allows for lift and stable flotation, as well as maximum air pressure for centrifuging dust and debris to an output discharge duct. Such maximization of pressure allows for a variable RPM speed adjustment for the flotation impeller, thus facilitating use of the device for varying types of carpeting and carpet pile. Further, the pressure seal cooperates with the platform to which it is attached to form a centrifugal platform/shelf on which suctioned or cut material (dust and debris or grass cuttings as the case may be) is easily and efficiently conveyed to a discharge port for collection. This platform/shelf could also advantageously be used in conventional wheeled devices.

It should be appreciated by those skilled in the art that the specific embodiments disclosed above may be readily utilized as a basis for modifying or designing other structures for carrying out the same purposes of the present invention. It should further be realized by those skilled in the art that such equivalent constructions do not depart from the spirit and scope of the invention as set forth in the appended claims.

What is claimed is:

1. In an air-floated apparatus having a deck with an open bottom, a platform enclosing a portion of the open bottom of the deck to define a pressure chamber, and means for pressurizing air in the pressure chamber to float a housing above a support surface, the platform having an opening and the deck having an outer periphery, the improvement comprising:

a structural member supported between the deck and the platform along a predetermined portion of the deck outer periphery, the structural member including an upper wall and a lower wall defining a chamber.

2. The air-floated apparatus as described in claim 1 wherein the predetermined portion of the deck outer periphery is a front portion of the apparatus.

3. The air-floated apparatus as described in claim 1 wherein the predetermined portion of the deck outer periphery is a front portion and first and second side portions of the apparatus.

4. The air-floated apparatus in described in claim 1 wherein the predetermined portion of the deck outer periphery is a front portion, first and second side portions and a back portion of the apparatus.

5. The air-floated apparatus as described in claim 1 wherein the chamber is substantially enclosed.

6. The air-floated apparatus as described in claim 5 further including a liquid medium supported in the enclosed chamber.

7. The air-floated apparatus as described in claim 1 further including a housing overlying the deck such that a conveyance duct is formed between the deck and the housing along a portion of the apparatus.

8. The air-floated apparatus as described in claim 7 further including a slot in a lower bottom wall of the structural member extending along the length of the chamber.

9. The air-floated apparatus as described in claim 8 further including means for exhausting air from the conveyance duct to suction material from the support surface.

10. The air-floated apparatus as described in claim 1 wherein the lower wall of the structural member is attached to the platform.

11. The air-floated apparatus as described in claim 1 further including flexible sealing means supported in the platform opening for preventing escape of the pressurized air from the housing.

12. The air-floated apparatus as described in claim 11 wherein the flexible sealing means comprises a seal formed of natural or synthetic rubber.

13. The air-floated apparatus as described in claim 12 wherein the seal has a bead at its distal inner end.

14. An air-floated apparatus, comprising:
a deck with an open bottom defining an outer periphery;
a platform enclosing a portion of the open bottom of the deck, the platform having an opening;
a housing overlying the deck such that a conveyance duct is formed between the deck and the housing along a portion of the apparatus; and
a structural member supported between the deck and the platform along a predetermined portion of the deck outer periphery, the structural member including an upper wall and a lower wall defining a chamber, the lower wall including a slot extending along the length of the structural member.

15. The air-floated apparatus as described in claim 14 further including means in communication with the conveyance duct for suctioning dust and debris from a support surface underlying the apparatus.

16. The air-floated apparatus as described in claim 14 further including means in communication with the conveyance duct for supplying pressurized air downward through the slot to float the apparatus.

17. The air-floated as described in claim 14 further including a flexible pressure seal supported by the platform and extending into the opening.

* * * * *